Patented Apr. 8, 1952

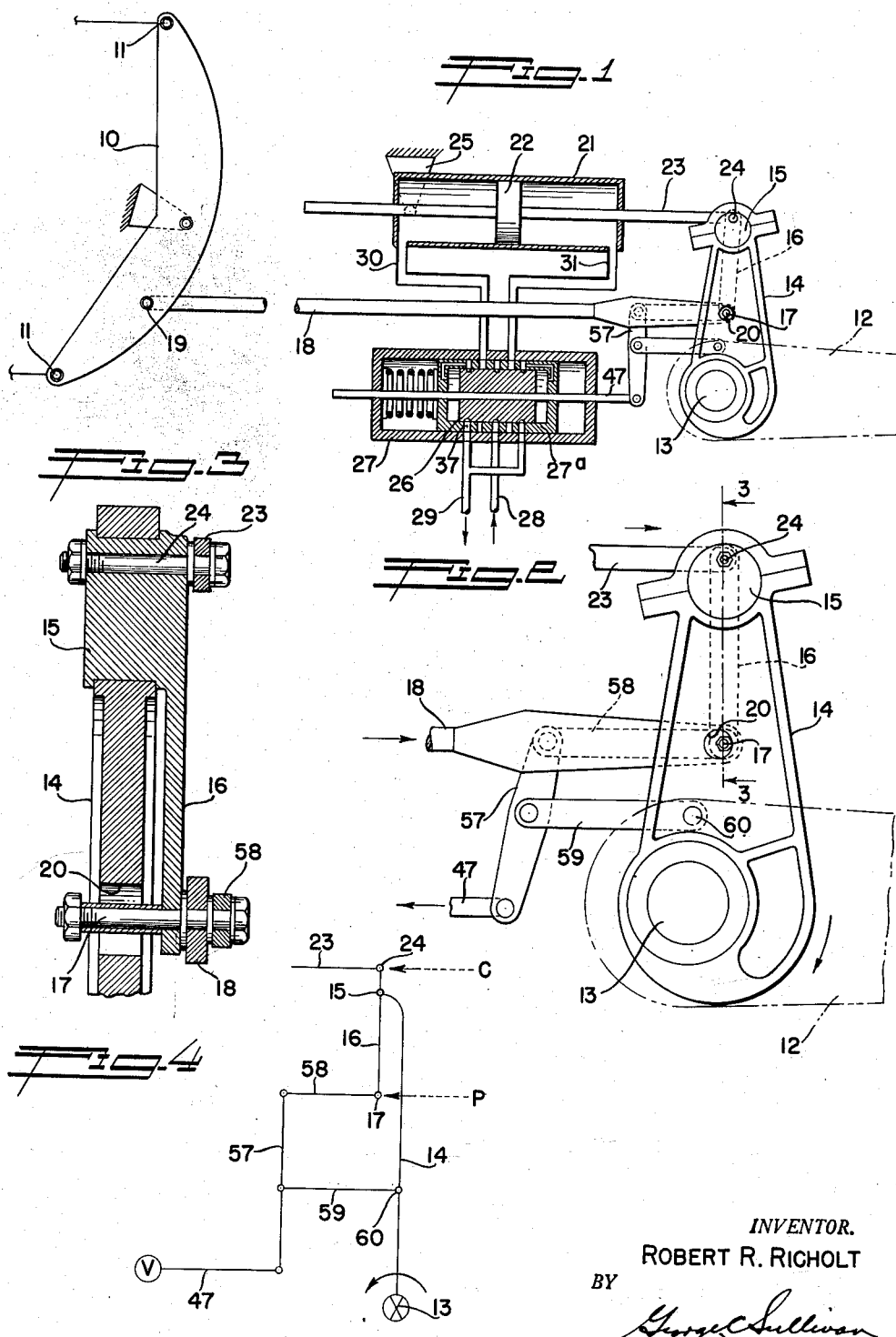

2,591,871

UNITED STATES PATENT OFFICE 2,591,871

POWER BOOSTER LINKAGE PROVIDING PILOT'S FEEL

Robert R. Richolt, Tujunga, Calif., assignor to Lockheed Aircraft Corporation, Burbank, Calif.

Original application August 9, 1943, Serial No. 498,021, now Patent No. 2,424,901, dated July 29, 1947. Divided and this application April 1, 1946, Serial No. 658,625.

4 Claims. (Cl. 121—41)

The present invention relates to power aided or servo boost systems for moving the aerodynamic control surfaces of large airplanes, and has special reference to hydraulic booster controls to help the pilot to move such heavily loaded control surfaces, while retaining a proportional feel or reaction of the forces acting on such surfaces. This application is a division of my application, Serial No. 498,021 filed August 9, 1943, now Patent No. 2,424,901, granted July 29, 1947, with added illustrations called for in the requirement for division made therein.

In order that the pilot may retain the feel of the controls, and thus avoid inadvertent application of excessive forces thereon, the controls must be reversible, i. e., forces on the surface must be able to restore the pilot's control to neutral upon release. It is therefore necessary that he provide a portion of the force required to move or hold the control surfaces displaced, the remaining force to be supplied by the power or servo mechanism, which is appropriately called a booster since it augments the pilot's strength in proportion to the effort he puts forth. A percentage or proportional boost, not necessarily linear, is desirable, since it thus converts the control feel of a big airplane into the accustomed feel of a smaller airplane without boost, so that the aerodynamic controls of the big airplane do not involve learning a new set of reactions or control responses. The boost ratio or feel for the various control surfaces should be, of course, adjustable or variable for different installations, for example, a greater boost ratio may be desirable on the rudder, depending on the aerodynamic design of the airplane, while the ailerons and elevators might require lesser boosts. As an example, a 50,000 pound airplane of fairly high speed might require the pilot to supply 30% of the elevator hinge moment and only 9% of the rudder hinge moment. Thus, the power booster would supply 70% of the elevator control force and 91% of the rudder control force.

An outstanding defect in such power booster systems as heretofore proposed is that of feedback and over-control and hunting of the control surfaces. Since both the hydraulic lines and mechanical parts of such systems have some elasticity, the response to a control movement is apt to overrun the desired point, so that the booster will reverse itself and thus produce self-energizing powered oscillations about the desired control setting. Such oscillations of the control surfaces transmit confusing reactions back through the pilot's control or feel mechanism, which ordinarily serves to transmit the manually produced proportion of the hinge moment, as well as initiating the operation of the booster controls. Moreover, such powered oscillation or "hunting" is capable of destroying the airplane if the natural period thereof approximately coincides with flutter-inducing aerodynamic disturbances, such for example, as are apt to occur in the wake of the propellers.

Accordingly, it is an object of this invention to provide an improved and simplified hydraulic booster control for aerodynamic control surfaces whereon a direct mechanical feel bar linkage is remotely operated by the pilot to operate the booster control valve through a distortable parallelogram linkage interconnecting the booster cylinder piston rod and the control surface lever or crank, the piston rod having an eccentric connection relative to a feel lever forming part of the parallelogram linkage, which feel lever is in turn pivoted in the control surface; the eccentricity of the piston rod connection relative to the feel lever connection determining the boost ratio, which ratio is readily changed by merely substituting a feel lever with a different eccentricity, so that the booster system of this invention is readily changed to accommodate various desired boost ratios without altering the basic structure and arrangement of the power cylinder and control valve.

It is also an object of this invention to provide an improved and simplified hydraulic booster control system wherein the booster mechanism can be mounted adjacent the surface to be controlled, without requiring the use of flexible hydraulic lines or hoses, the reliability of which is not certain.

Other and further important objects of this invention will be apparent from the disclosures in the specification and the accompanying drawing.

This invention is shown in a preferred form, as applied to the rudder controls of an airplane, but it will be understood that my invention may be applied to other control surfaces with only minor alterations such as a change in the boost ratio, and the latter may either increase or decrease in proportion to the angular movement of the control surface.

On the drawings:

Figure 1 is a schematic diagram of a booster system embodying the features of this invention, wherein the pilot supplies a percentage of the power required to operate the control system and the booster supplies the balance as energized by the movement of the pilot's control.

Figure 2 is an enlarged fragmentary showing of the linkage adjacent the rudder lever when energized clockwise.

Figure 3 is an enlarged section on the line 3—3 of Figure 2.

Figure 4 is a schematic diagram of the rudder, and valve linkage.

As shown in the drawings:

The booster system chosen for illustrative purposes is intended to be located adjacent to the controlled surface for direct mechanical operation thereof, and is therefore controlled from the pilot's station by means of conventional rudder pedals (not shown), which operate a walking beam 10 by means of a conventional cable system, the terminals 11 of which are attached to the walking beam. The control surface to be operated is shown as a rudder 12 pivoted about its axis 13 by a lever 14 to which both the walking beam and booster system are mechanically linked, as will now be described.

The free end of the lever 14 has a bearing to receive a hub 15 of a feel lever 16, the free end of which is shown as underlying the lever 14 and having a pivotal connection 17 to a feel bar 18, the other end 19 of which is connected to the walking beam. The movement of the free end of the lever 16 relative to the lever 14 is limited by the walls of an enlarged aperture 20 in the lever 14 which serve as stops for the projecting ends of the pivotal connection 17, so that when pilot force is applied to the walking beam, the feel bar 18 transmits this force to the lever 14 and can directly operate the same upon failure of the booster system. Ordinarily, the slight relative movement of the connection 17 in the aperture 20 is utilized to move the valve controlling the application of the power boost.

A power cylinder 21 has a piston 22 carried by a piston rod 23 reciprocable therein, the latter being eccentrically connected at 24 to the hub 15 of the feel lever. In order to avoid the need of a crosshead in the piston rod the cylinder is preferably pivoted at 25 to the airplane structure. From the geometry of the feel lever 16 and the eccentric connection of the piston rod thereto, as will be described in more detail in connection with Figure 4, the percentage of feel will be inversely proportional to the eccentricity of the connection 24 relative to the axis of the hub 15. Since a change in this eccentricity will change the boost ratio or percent of feel transmitted through the feel lever to the feel bar and thence to the walking beam and back to the pilot, it is a simple matter to substitute another lever 16 with a different eccentricity of the connection 24 in order to render the booster system applicable to installations requiring different amounts of boost.

With the foregoing arrangement, the operation of the feel bar 18 by the pilot rotates the feel lever 16 about its hub 15 and moves a control valve 26 in the opposite direction, through the parallelogram linkage, thus energizing the booster cylinder and piston rod 23. Normally, the feel lever 16 will initially fulcrum about the boost connection 24, as the boost piston 22 will be hydraulically locked with the control valve 26 in neutral. The eccentric connection of the rod 23 in the hub 15 tends to both move the rudder lever 14 and the feel lever 16, the division of the forces being determined by the eccentricity of the connection. Thus if the boost effect is intended to be 90%, then 90% of the booster power is applied to the rudder and 10% returned through the feel lever 16 and feel bar 18 to the pilot control so that the latter must be held in the desired position by a sustained force equivalent to 10% of the force or hinge moment applied to the rudder. The direction of movement of the booster piston rod is such as to return the feel lever 16 to its neutral position, after displacement of the lever 16 by the pilot's control, simultaneously resetting the control valve to neutral, as will now be described.

A four-way hydraulic valve piston 26 has its body 27 arranged with separate supply 28 and return or sump 29 hydraulic connections, as well as connections 30 and 31 to either end of the power cylinder 21, the valve piston functioning to distribute power fluid from the supply connection 28 to either end of the power cylinder through one of the connections 30 or 31 while simultaneously connecting the other connection 31 or 30 to the return or sump connection 29. To this end the valve body 27 is provided with an inserted sleeve 27$^a$ having a series of five grooves turned therein, the end grooves 32 arranged in alignment with passages in the body 27 leading into the sump connection 28 while the center groove 34 is similarly arranged for direct connection to the supply connection 28. The two remaining grooves are arranged to respectively connect to the power cylinder connections 30 and 31. Each groove has a number of apertures 37 extending to the inner surface of the sleeve, and these apertures actually form the ports which are covered and uncovered by axial movement of the valve piston 26 within the sleeve.

The valve piston 26 is formed as a cylinder divided into four lands, of which the two center lands control the ports leading to the several connections, and the two outer lands form dashpot pistons 39 as has been more fully described in the parent application of which this is a division. The valve piston 26 is reciprocated in the sleeve by means of a rod 47 connected to the feel lever 16.

The valve stem 47 is connected by a distortable quadrilateral linkage to the pivotal connection 17 between the feel lever 16 and the feel bar 18. This linkage comprises a vertical lever 57 pivoted at one end to the rod 47 and at the other to a horizontal link 58, which latter is in turn pivoted to the connection mentioned, while at the mid-point of the vertical lever 57, a second horizontal link 59 is pivoted, which at its other end is connected to the rudder lever 14 at 60. Thus the fourth side of the quadrilateral linkage is indirectly formed by the pin 17 of the movable feel lever 16 and the connection 60 to the rudder lever, whereby relative pivoting of the lever 16 serves to distort the quadrilateral linkage to move the valve stem 47 and valve 26 to energize the booster system.

Figure 4 has been presented in order to better explain the feel arrangement. In the case of initiation of movement by the pilot, he applies force at 17 indicated by P to initially pivot the lever 16 about its upper connection 24 to the hydraulically locked piston rod 23. This causes a slight movement of the lever hub 15 with a corresponding movement of the rudder, while at the same time, if sufficient pilot force is applied, the pin 17 contacts the edge of the hole 20 to open the valve 26, applying force to the piston rod 23 as indicated by C. When the valve 26 energizes the piston rod 23 the lever 16 changes its class and pivots about its hub 15. Under these conditions the pilot force P times its radius from the axis of hub 15 must slightly overcome the force C applied by the boost cylinder times its eccentric radius in the hub 15, in order to hold the pin 17 against the wall of the hole 17 and thus continue the supply of boost power.

When the pilot merely wants to hold an established load on the rudder, the force P times its radius balances the force C times its radius, both relative to the axis of the hub 15. Under such conditions of stability, the booster cylinder becomes hydraulically locked when the pin 17 is centered in the hole 20. The pilot must then hold the load P in order to prevent the air load on the rudder from reversing the booster by moving the pin 17 in the other direction in the hole 20.

From the foregoing it will be evident that the relative radii of the forces P and C determine the effective boost ratio or per cent of the total load on the rudder that the pilot has to supply to match or over-control the booster force.

It will thus be seen that I have invented an improved and simplified hydraulic booster control system for the purpose described having a direct mechanical feel or feed-back to the pilot's control and in which the booster has an increased sensitivity and responsiveness to pilot control movements.

Having thus described my invention and the present preferred embodiments thereof, I desire to emphasize the fact that many modifications may be resorted to in a manner limited only by a just interpretation of the following claims.

I claim as my invention:

1. An aircraft control system including a movable control surface, a power booster comprising a hydraulic motor operatively connected to said control surface to supply a proportion of the force required to move the same, a piston valve hydraulically interconnected with said motor and adapted to control the operation thereof, a pilot operated primary control for the operation of said piston valve, in combination with means interconnecting the primary control with the piston valve and with the control surface to simultaneously operate said valve and to apply the pilot's portion of the force required to move the control surface, said means including a lever arm carried by said control surface, and a feel lever pivoted at one end in said lever arm and mechanically linked at its free end to both the valve and the pilot's control, the pivoted end of said feel lever having a connection to said motor eccentric to the pivotal connection of the feel lever and lever arm in opposing relationship to the valve and pilot's control linked thereto, and forming the operative connection between the motor and the control surface, whereby the feel lever is pivotally balanced in the lever arm between the pilot's control and said operative connection.

2. An aircraft control system including a movable control surface, a power booster comprising a hydraulic motor operatively connected to said control surface to supply a proportion of this force required to move the same, a piston valve hydraulically interconnected with said motor and adapted to control the operation thereof, a pilot operated primary control for the operation of said piston valve, in combination with means interconnecting the primary control with the piston valve and with the control surface to simultaneously operate said valve and to apply the pilot's portion of the force required to move the control surface, said means including a lever arm carried by said control surface, a feel lever pivoted at one end in said lever arm and mechanically linked at its free end to both the valve and the pilot's control, the pivoted end of said feel lever having a connection to said motor eccentric to the pivotal connection of the feel lever and lever arm in opposing relationship to the valve and pilot's control linked thereto, and forming the operative connection between the motor and the control surface, whereby the feel lever is pivotally balanced in the lever arm between the pilot's control and said operative connection, and means limiting the motion of the feel lever relative to the lever arm whereby the pilot's control is adapted to directly operate the control surface upon failure of the power booster.

3. In a control mechanism of the class described, a movable element adapted to be controlled, a power booster, a manually movable walking beam, and interconnecting mechanism providing for the operation of said element under simultaneous direct mechanical control by said walking beam and by said power booster, comprising a feel lever having a pivot at one end in operating relationship to said movable element, and a pivot at the other end connected to said walking beam, and means eccentrically connecting said power booster to the first mentioned pivot of said feel lever whereby the power applied by said booster is balanced against the manual force applied through said walking beam to provide a proportionate feel of the total load applied to the movable element.

4. In a control mechanism of the class described, a movable element adapted to be controlled, a power booster, a manually movable walking beam, and interconnecting mechanism providing for the operation of said element under simultaneous direct mechanical control by said walking beam and by said power booster, comprising a feel lever having a pivot at one end in operating relationship to said movable element, and a pivot at the other end connected to said walking beam, and means eccentrically connecting said power booster to the first mentioned pivot of said feel lever whereby the power applied by said booster is balanced against the manual force applied through said walking beam to provide a proportionate feel of the the total load applied to the movable element, and means for energizing said power booster in response to unbalanced conditions between said booster eccentric connection and said walking beam connection to said feel lever.

ROBERT R. RICHOLT.

REFERENCES CITED

The following references are of record in the file of this patent:

UNITED STATES PATENTS

| Number | Name | Date |
|---|---|---|
| 2,107,110 | Eaton | Feb. 1, 1938 |
| 2,227,273 | Price | Dec. 31, 1940 |
| 2,284,298 | Newton | May 26, 1942 |
| 2,358,753 | Willett | Sept. 19, 1944 |
| 2,366,382 | Burton | Jan. 2, 1945 |
| 2,389,274 | Pearsall | Nov. 20, 1945 |